Figure 7:
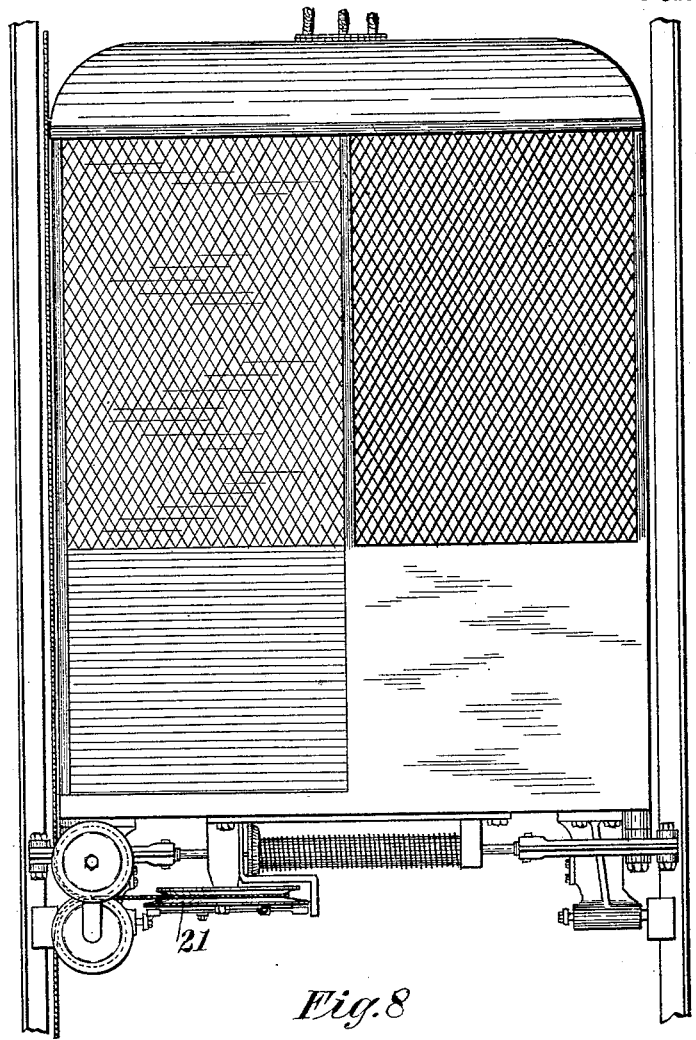

No. 638,763. Patented Dec. 12, 1899.
A. B. SEE & A. COWPERTHWAIT.
SAFETY DEVICE FOR ELEVATORS.
(Application filed Apr. 5, 1899.)
(No Model.) 3 Sheets—Sheet 1.
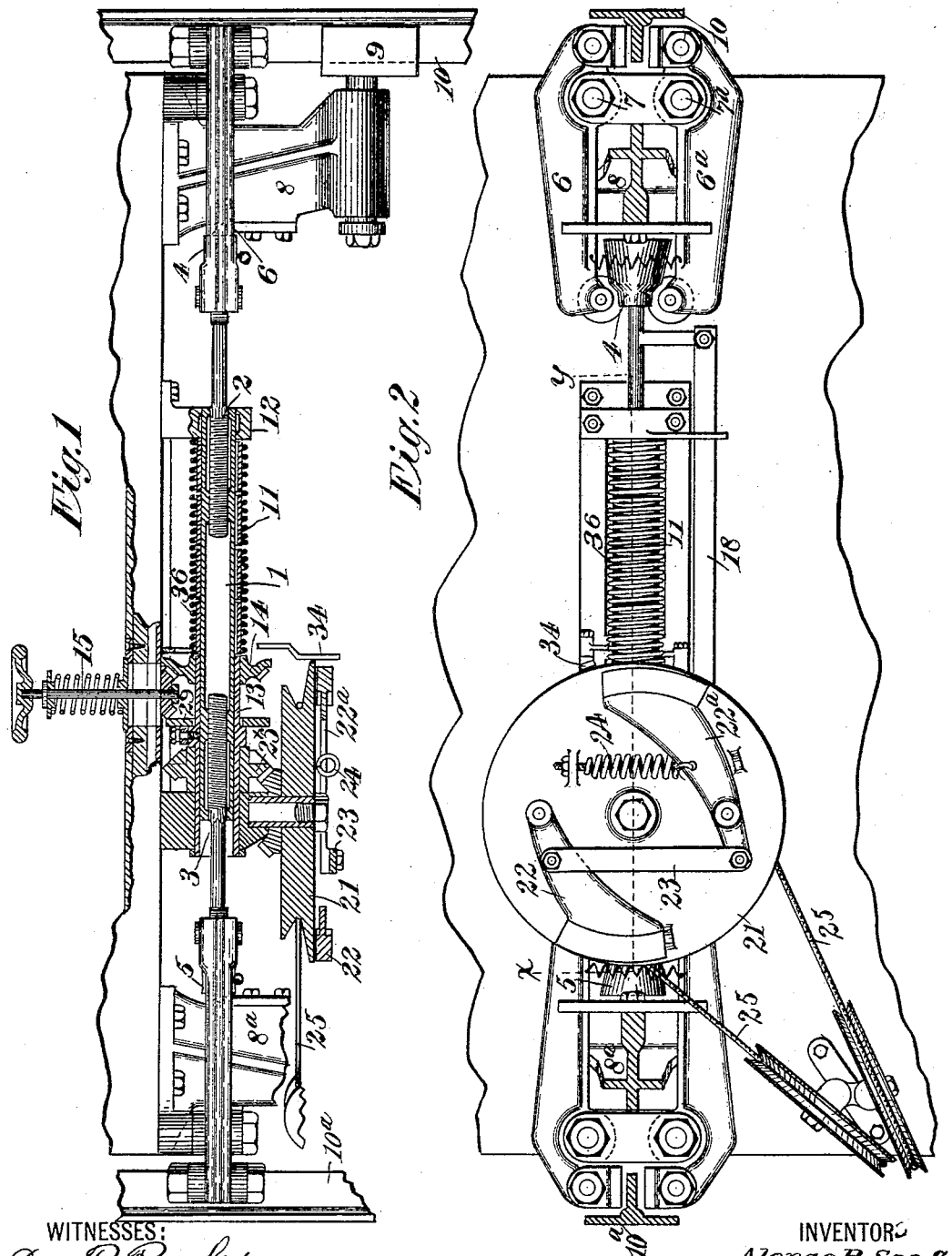
WITNESSES:
Geo. B Rowley.
Elizabeth Ewing
INVENTORS
Alonzo B. See &
Allan Cowperthwait.
BY
Their ATTORNEY

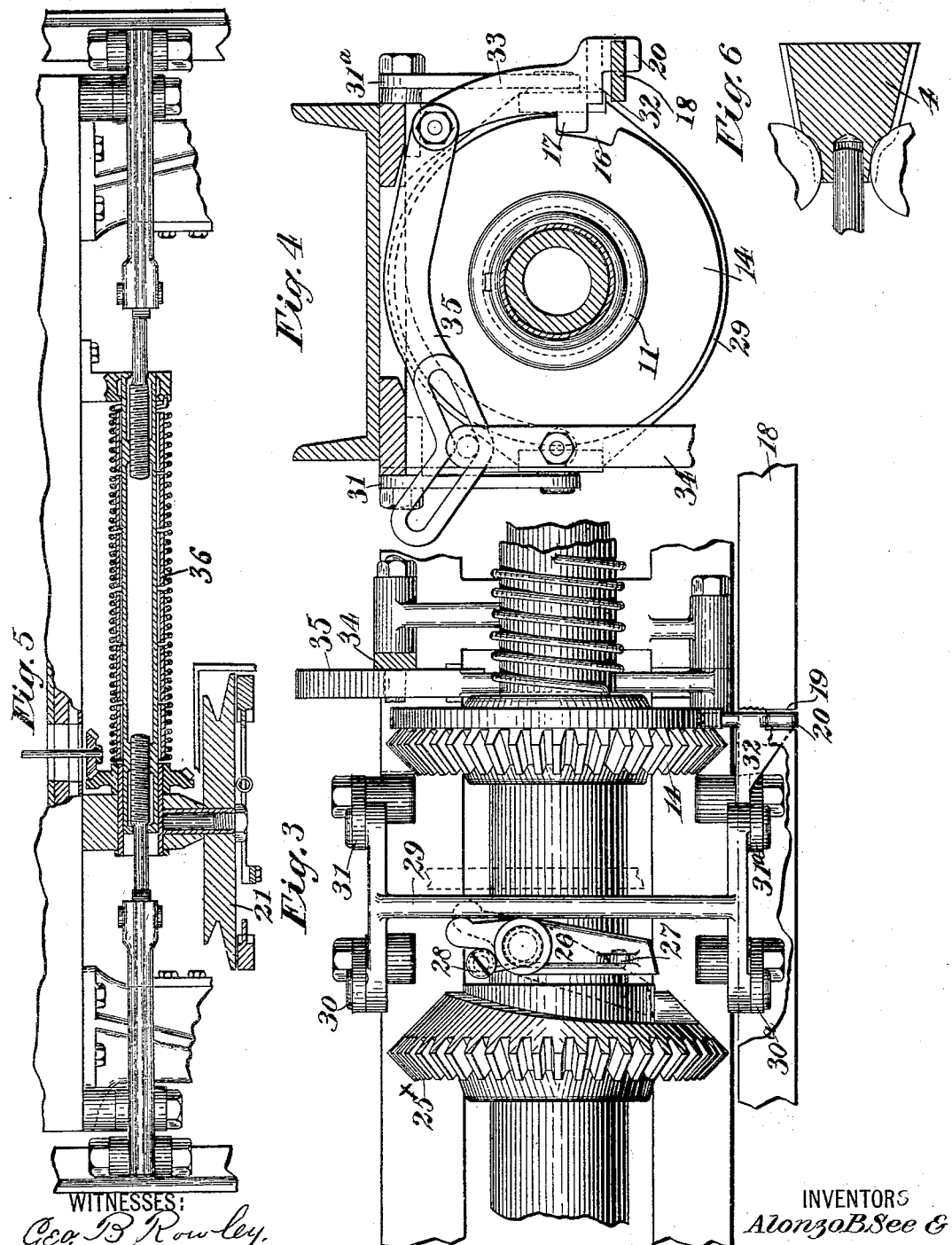

No. 638,763. Patented Dec. 12, 1899.
A. B. SEE & A. COWPERTHWAIT.
SAFETY DEVICE FOR ELEVATORS.
(Application filed Apr. 5, 1899.)
(No Model.) 3 Sheets—Sheet 3.

WITNESSES:
Geo. B. Rowley.
Elizabeth Ewing

INVENTORS
Alonzo B. See &
Allan Cowperthwait.
BY
ATTORNEY

UNITED STATES PATENT OFFICE.

ALONZO B. SEE AND ALLAN COWPERTHWAIT, OF NEW YORK, N. Y., ASSIGNORS TO THE A. B. SEE MANUFACTURING COMPANY, OF SAME PLACE.

SAFETY DEVICE FOR ELEVATORS.

SPECIFICATION forming part of Letters Patent No. 638,763, dated December 12, 1899.

Application filed April 5, 1899. Serial No. 711,798. (No model.)

*To all whom it may concern:*

Be it known that we, ALONZO B. SEE and ALLAN COWPERTHWAIT, of New York, (Brooklyn,) in the county of Kings and State of New York, have invented certain new and useful Improvements in Safety Devices for Elevators, of which the following is a specification.

The object of this invention is to provide a safety-catch for elevators which will be more prompt and effective in its action than such devices as heretofore constructed.

In carrying out the invention we provide an apparatus mounted on and moving with the car by which the energy of a spring or equivalent device may be stored in a condition of readiness for instant action and controlled by releasing devices which are set free when the car reaches a dangerous speed, thereby releasing the stored energy of the spring and permitting the latter to unwind and bring into action gripping devices to engage the guide-rails along which the car moves in the shaft. We prefer in cases where large heavy cars are used to provide an auxiliary catch-controlling mechanism governed by the movement of the car and which after the release of the spring will act to set the catches into firm engagement with the guide-rails. The value of the spring in this case lies more in its ability to instantly take up the necessary clearance and backlash of the apparatus than in the power it actually exerts upon the guide-rails. We provide the car with a winding mechanism, by which the spring may be wound up, and with an automatic governor, thrown into action when the car attains too high a speed to release the spring. There have been in use heretofore two general forms of safeties for elevators operated by a governor, one in which a spring was released and the power stored up in the spring meant to stop the car, and the other in which the descent of a car unwound a rope from the drum or passed over sheaves and turned a nut which caused the guides to clamp. Both of these systems have their defects. Where the spring alone is used, the power has to be stored in it sufficient to stop the car with the heaviest load, which makes a very sudden stop and usually brings into action an amount of power greatly in excess of that needed to stop the elevator. In the other system the car is required to descend through considerable distance in order to unwind the amount of rope necessary to bring the jaws into action, as they require considerable clearance while the elevator is running in ordinary operation. By the present invention we overcome both of these defects. The spring instantly takes up all lost motion, bringing a certain pressure on the guide, which is augmented by a heavier pressure if the car should be so heavily loaded as to move on after the spring is set, so that by this invention the pressure is instantly applied to the guides to check the car without a shock or excessive strain on any part of the mechanism, while the rope and gearing give gradually all the additional power required to stop the heaviest load.

The several features of novelty of the invention will be more particularly hereinafter described and will be definitely indicated in the claims appended to this specification.

Figure 8:
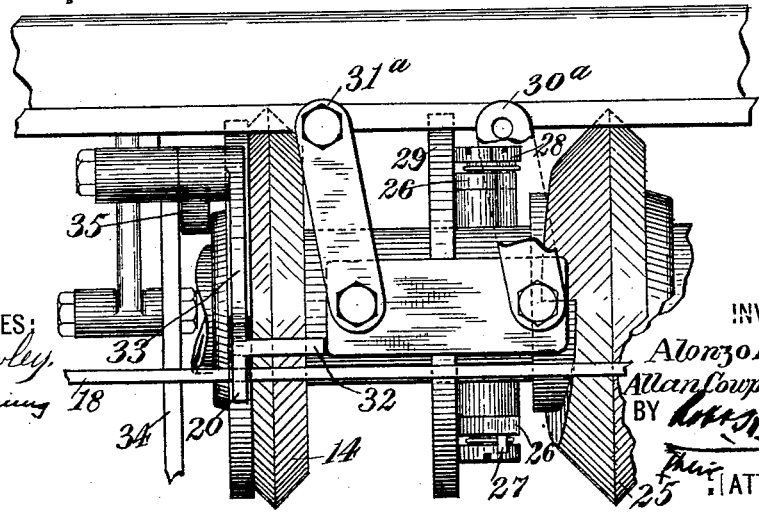

In the accompanying drawings, which illustrate the invention, Figure 1 is a sectional view of a safety device embodying our improvements, the plane of section being indicated by the irregular line $y$ of Fig. 2. Fig. 2 represents a bottom plan view of Fig. 1. Fig. 3 represents a bottom plan view of the controlling mechanism, the centrifugal governor being omitted for clearness of illustration. Fig. 4 is a detail view of the releasing device looking in a direction from the right-hand side of Fig. 3. Fig. 5 is a sectional view of a simplified form of safety device in which the stored energy of a spring alone is relied upon to set the safety-catch. Fig. 6 is a detail sectional view of one of the wedges which control the operation of the gripping-jaws. Fig. 7 shows a car with the simple form of safety-catch illustrated in Fig. 5 mounted thereon, and Fig. 8 is a detail view of parts of the controlling mechanism looking from the right-hand side of Fig. 4.

Referring first to the type of safety-catch shown in Figs. 1, 2, 3, 4, and 8, 1 represents a metal tube mounted to turn in brackets supported on the under side of the car and which is, in effect, a turnbuckle, the ends of which engage right and left hand threaded screws 2 3, terminating in wedges 4 5, (see Fig. 2,) which coöperate with rollers mounted in the ends of pivoted gripping-jaws 6 6ª, journaled on studs 7 7ª, mounted on brackets 8 8ª, supported at the sides of the bottom of the car, in which are also mounted guides, as 9, which engage the guide-rails 10 10ª, supported vertically in the elevator-shaft to give a true vertical movement to the car. The turnbuckle is inclosed within a spring 11, one end of which is fastened to a bracket or standard 12 and the other end to a tube 13, secured to and forming a part of the turnbuckle, to which is secured a bevel-gear 14. In operative relation to the gear is a depressible winding-key 15, carrying a gear-wheel at its lower end adapted to engage the bevel-gear 14. The key is controlled by a coiled spring and is provided with a handle within the car, by which it may be depressed and operated to wind the spring 11. On the periphery of the gear-wheel 14 is a notch 16, (see Fig. 4,) adapted to be engaged by a lug 17, which normally prevents the spring 11 from unwinding when the apparatus is set. Coöperating with the dog of which the lug 17 forms a part is a bar 18, (see Figs. 2 and 3,) which bar is secured to and moves with the rod on which the wedge 4 is mounted. This bar is provided with a notch 19, which when the spring is fully wound up occupies the position shown in Figs. 3 and 4 and permits a projection 20 of the dog 33 to drop into the notch, thereby permitting the lug 17 to enter the notch in the gear-wheel 14 and lock the spring. Until the winding is complete the bar acts as a stop, preventing the lug from slipping into the notch. The release of the gear-wheel 14 is controlled by a governor 21, on which are mounted pivoted weighted arms 22 22ª, connected together by a link 23 and controlled by a spring 24. The governor is provided with a grooved periphery, around which passes a cable 25, having one end fastened at the top of the shaft and weighted at the other end. This cable passes over guide-sheaves, as indicated in Fig. 7, which lead it to and from the governor. The governor-disk 21 is mounted to turn freely and normally engages a gear-wheel $25^{\times}$, turning freely on the tubular turnbuckle; but when the spring is unwound this gear-wheel is clutched to the turnbuckle by dogs 26, mounted on the turnbuckle. These dogs are spring-actuated, as indicated in Fig. 3, one end of their controlling-spring being fastened to a lug 27 near the toe of the dog and the other to a stud 28. The gear-wheel 25 is provided with notches on one face, as indicated in Fig. 3, into which the dogs project when free. The dogs are normally held out of engagement with these notches by the pressure of a frame 29, mounted to swing on links 30 31 and 30ª and 31ª. This frame is normally prevented from swinging by the lateral projection 32, which forms part of the releasing-dog 33. The weighted arms of the governor when it reaches a critical speed are thrown out beyond the periphery of the disk on which they are mounted to engage the free end of a pivoted lever 34, (see Figs. 1, 2, and 4,) the upper end of which carries a pin engaging a V-shaped slot formed in a bar 35, forming an extension of the dog 33. Thus when the bar 34 is moved in either direction by extraordinary speed of the car in either direction through the expansion of the centrifugal governor the dog 33 is moved away from the notch 16 and the spring permitted to unwind. The rapid uncoiling of the spring thereby draws the wedges 4 toward the center of the car and brings the jaws of the clutch instantly into close relation to the guide-rails. Simultaneously the removal of the stop 32 (see Fig. 3) permits the frame 29 to be shifted by gravity to a vertical position and dogs 26 to engage gear-wheel 25. The turnbuckle is now operatively connected through gear-wheel 25 to governor-wheel. Any further movement of the car and the accompanying movement of the governor-wheel further tightens the jaws of the clutch and finally brings the car to a stop.

In order to prevent frictional engagement of the spring with the turnbuckle, we inclose within it spacing-tubes 36, (see Figs. 1 and 5,) which loosely inclose the turnbuckle-tube. The apparatus thus far described is intended for use particularly on heavy cars. We may, however, in many cases dispense with the use of gear-wheel 25, depending solely upon the power of the spring to produce an engagement of the gripping devices with the side rails of the elevator-shaft. Such an organization is shown in Figs. 5 and 7. The releasing mechanism is the same as that heretofore described, and the mode of control is exactly the same, except that the movable frame 29 and the dogs 26 and gear-wheel 25 are not employed.

The operation of the apparatus is as follows: When the car attains a dangerous speed or if the hoisting-cable should break and the car should start to fall, the speed of the governor will increase, throwing out arms 22 22ª, which strike the lever 34, thereby releasing the dog 33, permitting the spring to act and operate the turnbuckle, drawing toward the center of the car the wedges 4 5. In cases where the spring alone is relied upon to set the gripping-jaws the recoil of the spring will move the wedges 4 5 to give a powerful grip on the guide-rails 10 10ª. Where, however, the auxiliary catch-controlling devices shown in Fig. 1 are employed, the release of the dog 33 removes the lug 32 from the path of the frame 29 and permits the latter to drop to a vertical position under the influence of gravity, and the dogs 26 engage the gear-wheel 25, thereby turning the latter with the governor and further shifting inwardly the wedges 4 5, thus causing the gripping-jaws to more firmly engage the guide-rails and securely lock the car thereto.

In winding the spring the depression of the winding-key 15 forces the frame 29 to the left, thereby disconnecting dogs 26 from gear-wheel 25. Lug 17 is prevented from dropping into notch 16 by bar 18, the notch of which has been shifted away from the lug 20 by the drawing inward of the rod 2 when the spring unwound. When, however, the spring is fully wound, the bar 18 will have been shifted laterally by turnbuckle sufficiently to bring notch under lug 20, and dog 33 drops by gravity into engagement with notch 16 and locks the spring.

Having thus described our invention, what we claim as new, and desire to secure by Letters Patent, is—

1. A safety device for electric elevators, comprising a coil-spring mounted on the car, a tubular support for said spring, a screw controlled by the spring and extending into the tubular support, a clutch in operative relation to the sides of the elevator-shaft adapted to be controlled by the screw, and a releasing device controlled by the speed of the car, for releasing the coil-spring.

2. A safety device for an elevator comprising clutch devices mounted on the car coöperating with the sides of the elevator-shaft, a coil-spring coöperating therewith, a governor controlled by the speed of the car for releasing said spring whereby the clutch may be quickly brought into operative relation with the guide-rails of the shaft, and auxiliary mechanism controlled by the governor thrown into operative relation to the clutch to tighten its grip after the spring has been released.

3. A safety device for elevators comprising a coil-spring mounted on the car, a turnbuckle forming a support for the spring operated thereby, and a clutch set thereby into engagement with the side rails of the shaft, a screw and screw-fed devices for the clutch controlled by the turnbuckle, a centrifugally-controlled governor for releasing the spring, and winding mechanism accessible from the inside of the car for winding up the spring.

4. In a safety device for an elevator, the combination of a clutching device mounted on the car, a turnbuckle controlled thereby, a coil-spring controlling the operation of said turnbuckle, a governor controlled by the speed of the car to release the spring, a freely-turning part of the turnbuckle controlled by the governor and kept in motion thereby, and a clutch controlled by the release of the spring to effect a connection of the free-moving part with a normally-inactive spring-controlled part of the turnbuckle.

5. In a safety device for elevators, the combination of a coil-spring mounted on and traveling with the car, clutch devices coöperating with the guide-rails of the elevator-shaft controlled by said spring, winding mechanism coöperating with the spring and accessible from the inside of the car, a dog adapted to lock the spring when wound, and a movable device controlled by the spring preventing the engagement of the dog until the spring is fully wound.

6. In a safety device for elevators, the combination of a turnbuckle, a screw and screw-fed gripping-jaws operated by the turnbuckle, a coil-spring engaging the turnbuckle and supported thereby, a detent to lock the spring, a releasing-lever, and a centrifugally-operated device to operate the lever when the elevator attains a dangerous speed.

7. In a safety device for elevators, the combination of a turnbuckle, a screw and screw-fed gripping-jaws operated by the turnbuckle, a coil-spring engaging the turnbuckle, a detent to lock the spring, a releasing device for the detent, a centrifugal governor to operate said device, and a stop to prevent engagement of the detent until the spring is wound to the desired tension.

8. In a safety device for elevators, the combination of a turnbuckle, a screw and screw-fed gripping-jaws operated by the turnbuckle, a coil-spring engaging the turnbuckle, a detent to lock the spring, a centrifugally-controlled releasing device for the detent, gear-wheel 25 normally turning free on the turnbuckle, and means for connecting the gear-wheel and turnbuckle when the spring is released.

9. In a safety device for an elevator, the combination of a turnbuckle, a screw and screw-fed gripping-jaws operated by the turnbuckle, a coil-spring engaging the turnbuckle, a centrifugally-controlled detent for the coil-spring, gear-wheel 25 normally turning freely on the turnbuckle-governor 21 engaged thereby, engaging devices for positively connecting the gear-wheel and turnbuckle, means for operating said devices when the detent is released, and means for unlocking the same when the spring is rewound.

10. In a safety device for an elevator, the combination of a tubular turnbuckle, a screw and screw-fed gripping-jaws operated by the turnbuckle, a coil-spring controlling the turnbuckle, and rings loosely inclosed thereby between the spring and turnbuckle, for the purpose set forth.

In testimony whereof we have hereunto subscribed our names this 4th day of April, A. D. 1899.

ALONZO B. SEE.
ALLAN COWPERTHWAIT.

Witnesses:
ROBT. H. READ,
ALICK G. MACANDREW.